United States Patent [19]

Samela et al.

[11] Patent Number: 5,528,167
[45] Date of Patent: *Jun. 18, 1996

[54] COMBINATION OF TERMINATOR APPARATUS ENHANCEMENTS

[75] Inventors: Francis M. Samela, Lombard; William L. Zuckerman, Skokie, both of Ill.

[73] Assignee: Methode Electronics, Inc., Chicago, Ill.

[*] Notice: the term of this patent shall not extend beyond the expiration date of Pat. No. 5,313,105.

[21] Appl. No.: 228,259

[22] Filed: Apr. 15, 1994

Related U.S. Application Data

[63] Continuation of Ser. No. 988,908, Dec. 10, 1992, Pat. No. 5,362,991, and a continuation of Ser. No. 883,303, May 14, 1992, Pat. No. 5,313,105.

[51] Int. Cl.$^6$ .................................................. H03K 17/16
[52] U.S. Cl. ........................... 326/30; 333/22 R; 327/540
[58] Field of Search .................................. 326/30, 62, 82, 326/21; 333/22 R, 124, 125; 375/36; 327/540

[56] References Cited

U.S. PATENT DOCUMENTS

| | | |
|---|---|---|
| 3,619,659 | 11/1971 | Meyer et al. . |
| 4,339,677 | 7/1982 | Hoeft . |
| 4,434,403 | 2/1984 | Chang . |
| 4,536,667 | 8/1985 | Masuda . |
| 4,748,426 | 5/1988 | Stewart . |
| 4,831,283 | 5/1989 | Newton . |
| 4,920,339 | 4/1990 | Friend et al. . |
| 5,010,293 | 4/1991 | Ellersick . |
| 5,027,004 | 6/1991 | Palara . |
| 5,028,820 | 7/1991 | Sullivan . |
| 5,072,169 | 12/1991 | Saul et al. . |
| 5,089,724 | 2/1992 | Chuang et al. . |
| 5,182,526 | 1/1993 | Nelson . |
| 5,198,699 | 3/1993 | Hashimoto et al. . |
| 5,239,559 | 8/1993 | Brach et al. . |
| 5,254,878 | 10/1993 | Olsen . |
| 5,313,105 | 5/1994 | Samela et al. . |
| 5,362,991 | 11/1994 | Samela ...................................... 327/540 |

FOREIGN PATENT DOCUMENTS

| | | |
|---|---|---|
| 0531630 | 3/1993 | European Pat. Off. . |
| WO94/08305 | 4/1994 | WIPO . |

*Primary Examiner*—Edward P. Westin
*Assistant Examiner*—Jon Santamauro
*Attorney, Agent, or Firm*—Hill, Steadman & Simpson

[57] ABSTRACT

An SCSI bus line apparatus including in combination at least two of any of an active deassertion (ADR) circuit, a signal line impedance matching (SLIM) circuit and a signal line increased circuit kicker (SLICK) circuit. In the ADR circuit, if a current sinking circuit senses an increased voltage on the common node of the signal lines of a bus due to active deassertion of a signal line, the current sinking circuit sinks enough current from the signal lines to prevent an overcurrent condition on asserted signal lines or soon-to-be asserted signal lines. In the SLIM circuit, transient voltages are removed from a signal line by limiting to within a range the voltages that can appear on the signal line. In the SLICK circuit, a current switching device is controlled to provide current to raise the voltage level of a notch occurring in a signal on a signal line when the line is deasserted, but is responsive to a monitoring circuit for disconnecting the current when a programmed length of time has been exceeded after assertion.

11 Claims, 8 Drawing Sheets

1

COMBINATION OF TERMINATOR APPARATUS ENHANCEMENTS

RELATED APPLICATION DATA

This application is a Continuation-in-Part of both U.S. patent application Ser. No. 07/988,908, filed Dec. 10, 1992, now U.S. Pat. Ser. No. 5,362,991, and U.S. patent application Ser. No. 07/883,303, filed May 14, 1992, now U.S. Pat. Ser. No. 5,313,105 the disclosures both of which are incorporated herein by reference.

BACKGROUND OF THE INVENTION

The present invention generally relates to terminator apparatus. More specifically, the present invention relates to terminator apparatus used with a SCSI (acronym for small computer system interface) bus line.

One application where reliable data transfer becomes important is in the field of data transmission on a fully loaded SCSI bus line for communication between a plurality of data transceivers and a central processing unit (CPU) in a small computer. A SCSI system has a transmission line over which a plurality of units coupled to the transmission line may communicate. A regulated terminator, in accordance with the standard set forth in American National Standard for Information Systems X3T9.2/82-2 (the "ANSI standard"), is coupled to the two physical ends of the transmission line.

The SCSI system has drivers which drive the individual signal lines of the transmission line. A signal line may be in one of three states. First, a signal line is said to be "asserted" if a driver drives the signal line to the ground. Second, signal lines that are released from the asserted state are said to be "deasserted." Third, signal lines that are driven from the asserted state by a driver are said to be "actively deasserted."

The ANSI standard requires that asserted signal lines draw no more than 24 milliamperes (mA) of current. However, it has previously been difficult, if not impossible, to comply with this standard when active deassertion is used.

Deasserted signal lines have 2.85 volts on them because the regulated terminator made in accordance with the ANSI standard has a 2.85 volt voltage regulator that pulls deasserted lines up to 2.85 volts. If other signal lines are asserted (i.e., grounded), they will draw no more than the 24 mA allowed by the ANSI standard due to the 110 ohm resist or in each signal line [(2.85–$V_{ol}$ of driver)/110 ohms].

However, when a signal line is actively deasserted, it may have anywhere from 3.0 to 5 volts on it. If the voltage regulator of the regulated terminator cannot sink current, this higher voltage on the actively deasserted signal line is not regulated to 2.85 volts. Thus, if a signal line is asserted, it will draw more than 24 mA (e.g., 4.0 volts/110 ohms=36 mA). This may damage the driver or cause it to malfunction.

Although others have attempted to address driver damage and/or malfunction, attempts have fallen short of an adequate solution. For instance, Texas Instruments claims that its part number TL1431 can be used, along with other components, to sink current such that it is possible for an asserted signal line to draw an amount of current within the ANSI standard even if another signal line is actively deasserted. However, the TL1431, by Texas Instruments' admission, is limited to applications wherein only a limited number of signal lines are actively deasserted.

Typically, control signals REQ and ACK on respective request and acknowledge signal lines are used to perform a "handshake" so as to transfer the data back and forth between a target (i.e., a disk drive) and an initiator (i.e., a host computer). Each of the control signals REQ and ACK is either a high logic value or a low logic value. When the control signal REQ or ACK is asserted, it is at the low logic value. When the control signal REQ or ACK is deasserted, it is at the high logic value.

In operation, when the control signal REQ on the request line makes the transition from the asserted condition to the deasserted condition (i.e., low-to-high transition), there exists a condition of the SCSI bus line which can cause the corruption of data. At the rising edge of the control signal REQ, there will appear what is referred to as a "notch." This notch is typically accompanied by a reflection caused by stub drive cabling. The combined effect of the notch and the stub reflection will cause the rising edge of the control signal REQ to reverse its direction and "double back" before reaching the deassertion level (i.e., +2.0 volts). If this reversing control signal REQ falls below the +1.5 volt level, it may result in a "double trigger" and be interpreted as a valid request signal (i.e., another assertion), thereby causing erroneous data to be transferred.

As is generally known in the art of computer equipment manufacturing, a termination device is typically connected to each end of one OR-WIRED SCSI bus line for supplying a fixed supply voltage with a predetermined impedance. A bus line is one of a plurality of signal lines of a bus.

In FIG. 1, there are shown prior art termination networks 10 and 12 sometimes referred to as "220/330 terminators." Each of the termination networks 10 and 12 includes a voltage divider formed of two resistors T1 and T2 connected in series. One end of the resistor T1 is connected to an input power supply voltage TERMPWR, which is typically at +4.75 volts. One end of the resistor T2 is connected to a ground potential GND, which is typically at zero volts. The junction J1 of the resistors T1 and T2 for the termination network 10 is connected to one end of a bus line 14, and the junction J2 of the resistors T1 and T2 for the termination network 12 is connected to the other end of the bus line 14. For the SCSI bus, the value of the resistors T1 and T2 are shown to be 220Ω and 330Ω respectively so as to provide approximately +2.85 volts at the junction points J1 and J2 when the bus line 14 is not active.

The OR-WIRED SCSI bus 14 has a plurality of transceivers 16a, 16b and 16c which are connected thereto by respective signal lines 18a, 18b and 18c. Each of the transceivers 16a–16c includes a controller driver 20 having an open collector output (i.e., NAND logic gate type 7438) and a receiving device 22 (i.e., Schmitt trigger input type 7414). When the controller driver 20 is turned off, the signal line (i.e., line 18a) is at a high logic level which has a voltage value of approximately +2.85 volts. When the controller driver 20 is turned on, the signal line is at a low logic level since the open collector output device will pull the voltage value on the signal line down to approximately zero volts (i.e.,0.2 volts through the driver transistor Q1).

In FIG. 2, there is shown another prior art termination network 10a. This alternative arrangement of FIG. 2 is sometimes referred to as a "110 regulated terminator." The termination network 10a includes a voltage regulator 24 for receiving the voltage TERMPWR on line Vin and for generating a regulated voltage on line Vout of +2.85 volts with 110 ohm resistors to the respective 18 signal lines DB(0)–DB(7), DB(P), ATN, BSY, ACK, RST, MSG, SEL, C/D, REQ and I/O.

The principal unsolved problem of the prior art termination networks 10 or 10a was that neither one had the capability of raising the notch above the critical "double trigger" area (between +1.5 volts and +2.0 volts). As can be seen from the curve A of FIG. 5, the signal line in the 220/330 terminator has a notch N1 occurring at approximately +1.0 volts. Similarly, there is shown in the curve B of FIG. 5 that the signal line in the 110 regulated terminator has a notch N2 occurring at approximately +1.4 volts. Thus, these prior art termination networks did not teach how the notch could be raised above the critical area.

Further, with reference again to the prior art terminator of FIG. 1, it is also generally known that the voltage level of the notch is determined by the cable impedance and the amount of current present in bus line 14a when it is released or deasserted by its respective controller driver 20. While the SCSI specification defines cable impedance to be "no less than 90 ohms," twisted pair or "round cable" impedance is seldom found to be greater than 90 ohms and may be as low as 45 ohms.

Even though these controller drivers 20 have the capability of sinking more current, a problem occurs, referred to as "metal migration" when sinking high current over prolonged periods of time. This situation arises when the request control signal (REQ) is asserted, (low logic level) and the system fails to respond with the associated acknowledge control signal (ACK). In other words, the control signal REQ is being constantly asserted and does not deassert itself. Thus, this will cause the system to "hang" until the error is cleared up by deasserting the control signal REQ. If the unattended system hangs over an extended holiday weekend, this situation could last for many days without being corrected.

There is also known in the prior art of a terminator design which utilizes a diode clamping technique for raising the level of the notch by providing current in excess of the 24 mA. However, this prior art technique suffers from the disadvantage that this extra current is uncontrolled and may vary between 24 mA to 45 mA. Further, this extra current will be provided to the controller driver indefinitely when the system "hangs" and thus may result in the destruction of the costly controller driver.

Accordingly, a need has arisen in the computer equipment industry for an improved terminator apparatus for raising the level of the notch occurring in the data and/or control signals on the SCSI bus line so as to provide reliable and accurate data transmission. Further, it would be expedient that the terminator apparatus be capable of being incorporated internally into conventional termination networks or can be connected externally to existing systems having conventional termination networks.

Still further, a need has arisen in the computer equipment industry for an improved terminator apparatus for removing noise spikes or transients occurring in the control signals REQ and ACK on the SCSI bus line so as to provide reliable and accurate data transmission. It would also be expedient that the terminator apparatus be capable of being readily modified so as to accommodate a range of SCSI cable impedances.

Yet another need exists for an apparatus and a method for using the apparatus which complies with the ANSI standard in that it will not allow an asserted signal line to draw more current than is specified by the ANSI standard, in cases where the maximum allowable number of signal lines are actively deasserted.

SUMMARY OF THE INVENTION

The present invention provides an SCSI bus line apparatus including in combination at least two of any of an active deassertion (ADR) circuit, a signal line impedance matching (SLIM) circuit and a signal line increased circuit kicker (SLICK) circuit. In the ADR circuit, if a current sinking circuit senses an increased voltage on the common node of the lines of a bus due to active deassertion of a signal line, the current sinking circuit sinks enough current from the signal lines to prevent an over-current condition on asserted signal lines or soon-to-be asserted signal lines. In the SLIM circuit, transient voltages are removed from a signal line by limiting to within a range the voltages that can appear on the signal line. In the SLICK circuit, a current switching device is controlled to provide current to raise the voltage level of a notch occurring in a signal on a signal line when the line is deasserted, but is responsive to a monitoring circuit for disconnecting the current when a programmed length of time has been exceeded after assertion.

In an embodiment, the present invention provides a terminator apparatus used with a SCSI bus line for controlling the voltage level of a notch occurring on the bus line. Such terminator apparatus includes a termination network, a current switching device, and a programmed monitoring circuit. The termination network is interconnected between an input termination power supply voltage and a plurality of data and/or control signal lines coupled to the bus line for generating a first current. A current switching device is interconnected between the power supply voltage and each of the plurality of data and/or signal lines to be so terminated for generating a second current.

The programmed monitoring circuit is connected to a control input of the current switching device and the at least one of the plurality of data and/or control signal line for controlling a programmed length of time that the second current is generated. The current switching device is responsive to the monitoring circuit for disconnecting the second current when the programmed length of time has been exceeded. The second current serves to raise the voltage level of the notch occurring in the at least one of the plurality of data and/or control signal lines when it is deasserted so as to prevent erroneous data from being transferred.

In an embodiment, the present invention further provides an active deassertion circuit and a method of using the same. The active deassertion circuit is comprised of a means for providing a voltage reference that has an input and an output. Further, the active deassertion circuit also has a means for sinking current that has a first input, a second input, and output. The first input of the means for sinking current is coupled to the output of the means for providing a voltage reference. The means for sinking current compares the first input to the second input. If the voltage at the second input is higher than the voltage at the first input, due to active deassertion of at least one signal line of the transmission line, the means for sinking current sinks enough current to prevent an overcurrent condition on signal lines that are asserted or are going to be asserted.

In an embodiment, the present invention further provides a terminator method and apparatus used with a SCSI bus line for removing noise spikes or transients from data and/or control signals received on the bus line. The terminator apparatus includes a voltage regulator which is responsive to an input termination power supply voltage for generating a regulated output voltage of a predetermined value. A low voltage regulating circuit is responsive to the regulated output voltage for generating a reference voltage. Resistors are interconnected between the regulated output voltage and a plurality of data and/or control signal lines coupled to the bus line for generating termination impedances. A suppression network is interconnected between at least one of the plurality of data and/or control signal lines and the reference voltage for removing transients from the at least one signal line by limiting the range of the upper voltage level and the lower voltage level appearing thereon.

It is, therefore, an advantage of the present invention to provide an improved terminator apparatus which includes a termination network, a current switching device and a programmed monitoring circuit.

It is yet another advantage of the present invention to provide a terminator method used with an SCSI bus line for controlling the voltage level of a notch occurring in data and/or control signals transferred on the bus line.

Yet another advantage of the present invention is to provide an improved terminator method and apparatus for removing transients occurring in the data and/or control signals which is relatively simple and economical to manufacture and assemble.

A still further advantage of the present invention is to provide an improved terminator apparatus for removing noise spikes or transients occurring in the control and/or data signals on the SCSI bus line so as to provide reliable, accurate data transmission.

Moreover, another advantage of the present invention is to provide an improved terminator apparatus which includes a voltage regulator, a low voltage regulating circuit, a plurality of pull-up termination resistors, and a transient suppression network.

Another advantage of the present invention is to provide a terminator method used with a SCSI bus line for removing noise spikes from data and/or control signals transferred on the bus line.

Yet another advantage of the invention is the provision of a terminator apparatus including a circuit for sinking current appearing on a bus due to active deassertions of a signal line, thereby preventing an overcurrent condition on signal lines that are asserted or are going to be asserted.

Additional features and advantages of the present invention are described in, and will be apparent from, the detailed description of the presently preferred embodiments and from the drawings.

DETAILED DESCRIPTION OF THE PRESENTLY PREFERRED EMBODIMENTS

It is to be distinctly understood at the outset that the present invention shown in association with an SCSI bus is not intended to serve as a limitation upon the scope or teaching thereof, but is merely for the purpose of convenience of illustration of one example of its application. The present invention has numerous applications in other fields and apparatus since the invention pertains to a terminator apparatus for controlling the voltage level of a notch occurring in data and/or control signals.

Figure 1:
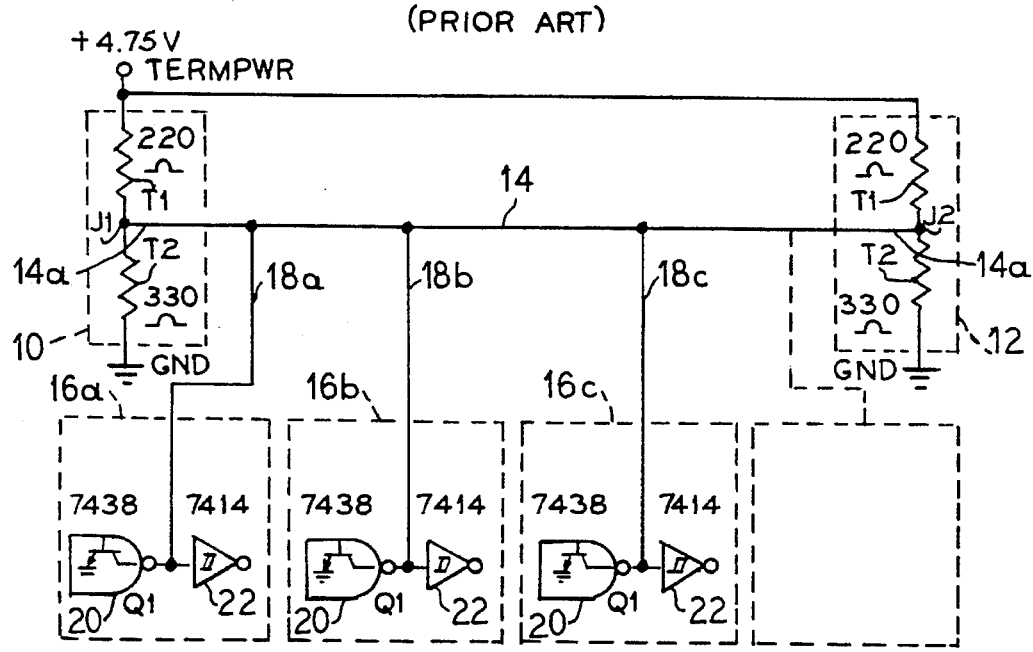
FIG. 1 illustrates prior art termination networks interconnected to the respective ends of an OR-WIRED SCSI bus line.
Figure 3:
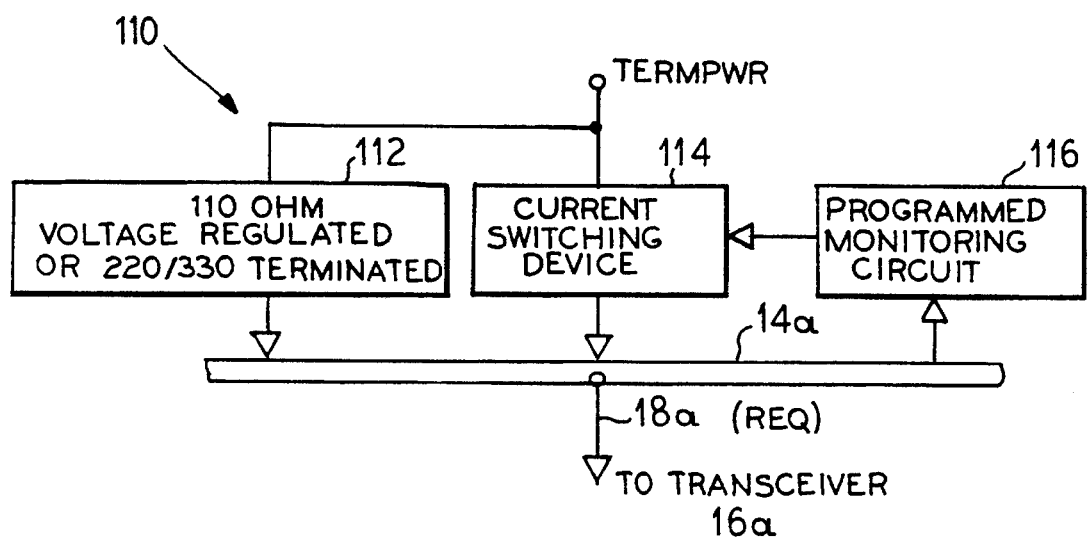
FIG. 3 illustrates a block diagram of an embodiment of an improved terminator apparatus, constructed in accordance with the principles of the present invention.

Referring now in detail to the drawings, there is shown in FIG. 3 a block diagram of an improved signal line increased current kicker (SLICK) terminator apparatus 110 which is constructed in accordance with the principles of the present invention. The terminator apparatus 110 is adapted to be used with or is connected to ends of a SCSI bus line 14a (similar to the bus line 14 in FIG. 1) for raising the voltage level of a notch occurring in data and/or control signals transferred on the bus line. For example, the transceiver 16a of FIG. 1 can be connected to the bus line 14a in FIG. 3 via the signal line 18a designated as a request signal line for a control signal REQ. The terminator apparatus 110 is comprised of a conventional termination network 112 (such as termination network 10 or 12 of FIG. 1), a current switching device 114, and a programmed monitoring circuit 116.

Figure 4:
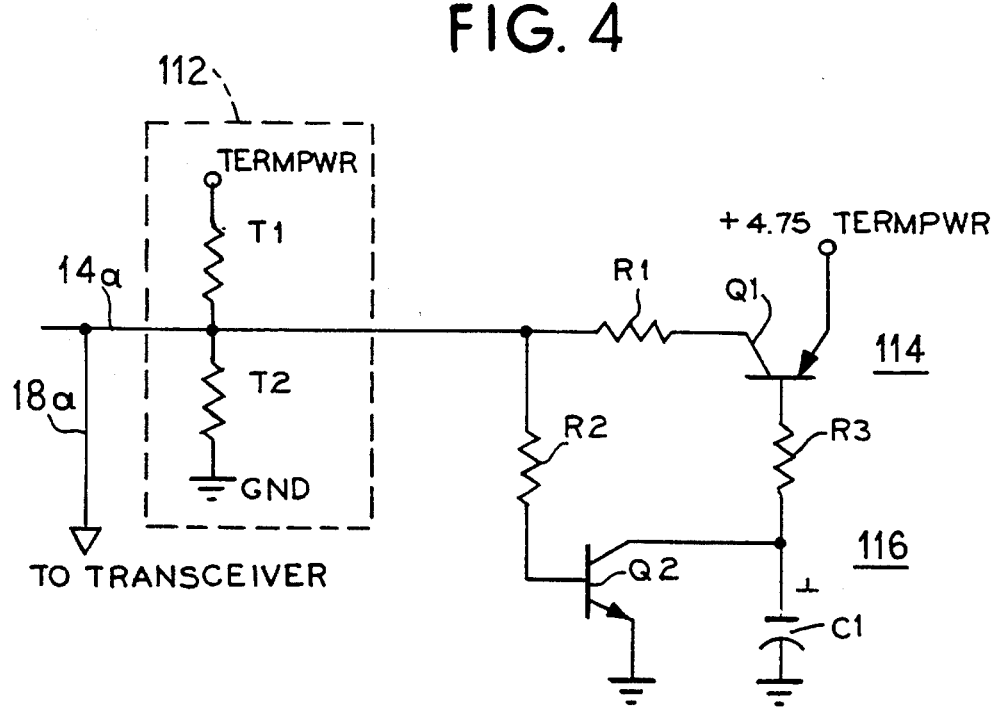
FIG. 4 illustrates a detailed schematic circuit diagram of an embodiment of the terminator apparatus of FIG. 3.

In FIG. 4, there is shown a detailed schematic circuit diagram of the SLICK terminator apparatus 110 of FIG. 3. For ease of illustration and discussion, the conventional termination network 112 is comprised of a 220/330 termination network similar to the termination network 10 or 12 of FIG. 1. Thus, the 220/330 terminator 112 includes a voltage divider formed of two resistors T1 and T2 connected in series. One end of the resistor T1 is connected to an input termination power supply voltage TERMPWR, which is typically at +4.75 volts. One end of the resistor T2 is connected to a ground potential GND, which is typically at zero volts. The junction of the resistors T1 and T2 for the termination network 112 is connected to one end of the bus line 14a.

The current switching device 114 includes a bipolar transistor Q1 of the PNP-type conductivity and a current-limiting resistor R1. The transistor Q1 has its emitter connected also to the power supply voltage TERMPWR and its collector connected to one end of the resistor R1. The other end of the resistor R1 is connected to the bus line 14a.

The programmed monitoring circuit 116 is comprised of resistors R2 and R3, a bipolar transistor Q2 of the NPN-type conductivity, and a capacitor C1. The transistor Q2 has its base connected to one end of the resistor R2, its collector connected to one end of the capacitor C1 and to one end of the resistor R3, and its emitter connected to the ground potential. The other end of the resistor R2 is connected to the bus line 14a, and the other end of the capacitor C1 is connected to the ground potential. The other end of the resistor R3 is connected to the base of the transistor Q1.

It should be clearly understood to those skilled in the art that additional current switching devices and programmed monitoring circuits similar to 114 and 116 could be connected to each of the other remaining signal lines so as to raise the voltage level of the notch appearing therein. However, in order to reduce costs, the current switching device and the programmed monitoring circuit are generally implemented only with the signal line which is highly sensitive to the notch. In other words, at least the control signal line (REQ) being the most critical to reliable and accurate data transfer has been implemented with such circuits.

Figure 2:
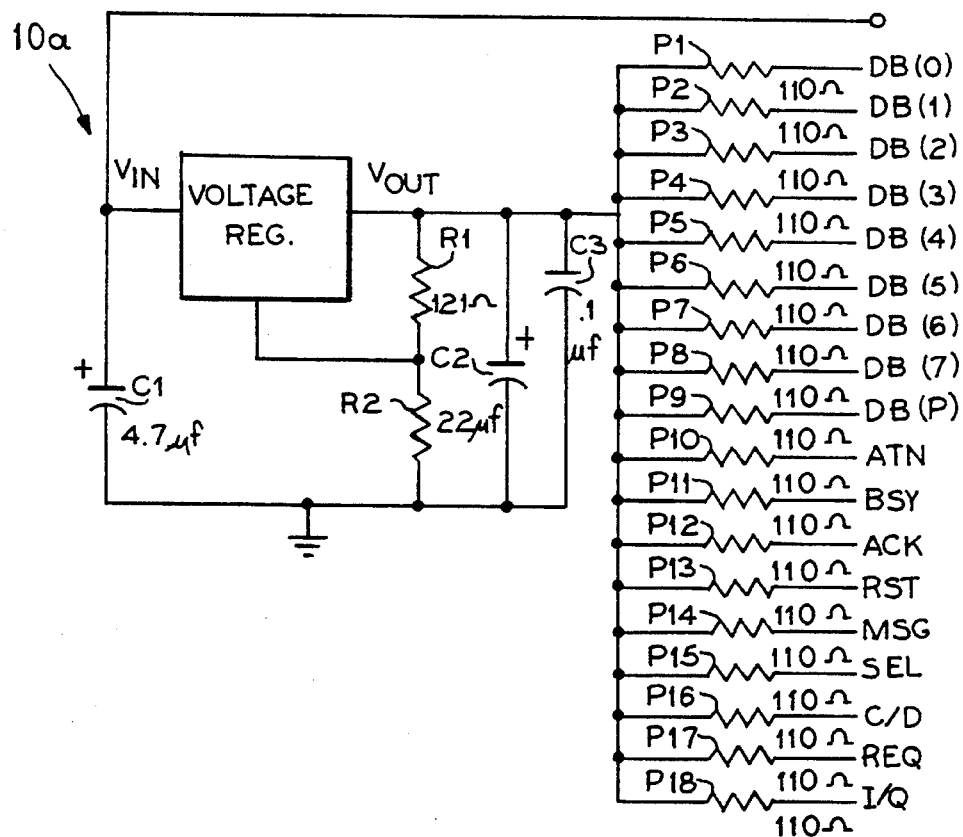
FIG. 2 illustrates another prior art termination network.
Figure 5:
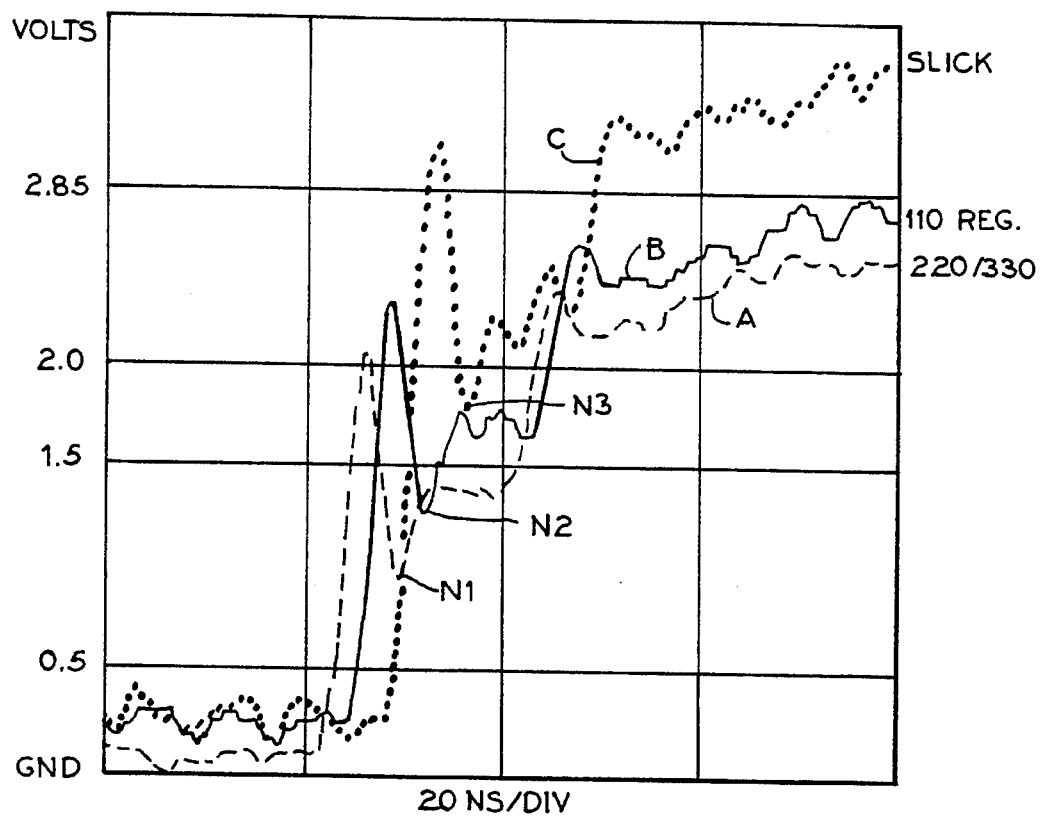
FIG. 5 illustrates waveforms appearing on respective signal lines, useful in understanding the operation of the present invention.

The operation of the present SLICK terminator apparatus 110 of FIG. 4 will now be explained with reference to the graphs of FIGS. 5, 6 and 7. In particular, the curve A of FIG. 5 illustrates the voltage level of the control signal REQ on the request signal line in the prior art 220/330 terminator of FIG. 1. As can be seen, when the control signal REQ is switched from the asserted condition (low logic level) to the deasserted condition (high logic level), a notch N1 occurs at approximately +1.0 volts. Similarly, the curve B of FIG. 5 depicts the control signal REQ on the request signal line in the prior art 110 regulated terminator of FIG. 2. As can be seen, when the control signal REQ is switched from the asserted condition to the deasserted condition, the notch N2 occurs at approximately +1.4 volts. Therefore, the notches N1 and N2 could be interpreted by a receiving device coupled to the SCSI bus line 14a as a valid request signal. As a result, such notches may cause incorrect data to be transferred.

The improved terminator apparatus 110 of FIG. 4 of the present invention will control or raise the voltage level of the notch appearing in the control signal REQ so as to produce the curve C of FIG. 5. When the control signal REQ makes the transition from the asserted condition to the deasserted condition, the notch N3 in the curve C will be raised above the "double trigger" area and now appears at approximately +1.8 volts.

Referring now again to FIG. 4, when the control signal REQ is deasserted (high logic level), the transistor Q2 of the monitoring circuit 116 will be turned on due to the base drive current via the resistor R2. Any residual voltage which may be present on the capacitor C1 will be discharged through the transistor Q2 to ground. Additionally, the base of the transistor Q1 will also be placed at the ground potential via the resistor R3. As a result, the transistor Q1 will be rendered conductive. Consequently, the resistor R1 will then be connected to the power supply voltage TERMPWR via the transistor Q1. This stable condition causes the power supply voltage to be connected to the request signal line 14a via the resistor R1.

When the control signal REQ on the line 18a is asserted (low logic level), the resistor R1 will provide instantaneously a second current path from the power supply voltage TERMPWR through the signal line 14a. This current flowing through the resistor R1 is in addition to that which is provided by the first current path via the resistor T1 in the termination network 112. Since the transistor Q1 is already turned on prior to the time of assertion, there will be no transients created on the request signal line 18a upon assertion. The amount of this additional current can be selected by controlling the value of the resistor R1 and may be set to a predetermined value consistent with cable impedance requirements.

The monitoring circuit 116 will now measure the length of time that the request signal line is being asserted. Further, if the period of assertion is longer than the programmed length of time, the additional current furnished by the second current path will be canceled. Therefore, the current supplied to the controller driver in the transceiver 16a via the signal line 18a will be limited to the current supplied by the termination network 112.

In particular, during the period of assertion, the transistor Q2 will be turned off. As a consequence, the capacitor C1 will begin to charge up towards the power supply voltage TERMPWR through the resistor R3 and the emitter-base junction of the transistor Q1, If the request signal line 18a remains asserted, such as a in the case of a "hung" system, the capacitor C1 will be charged to a point where the transistor Q1 will no longer be conductive. This condition occurs when the emitter-base voltage is less than approximately +0.7 volts.

For typical SCSI voltage, this time period is approximately two time constants (i.e., Tc=R3×C1). At the end of the "timeout" period, the transistor Q1 will be turned off. Therefore, the current added to the request signal line 18a by the second current path via the resistor R1 will be canceled, and only the current from the termination network 112 will be provided.

Figure 8:
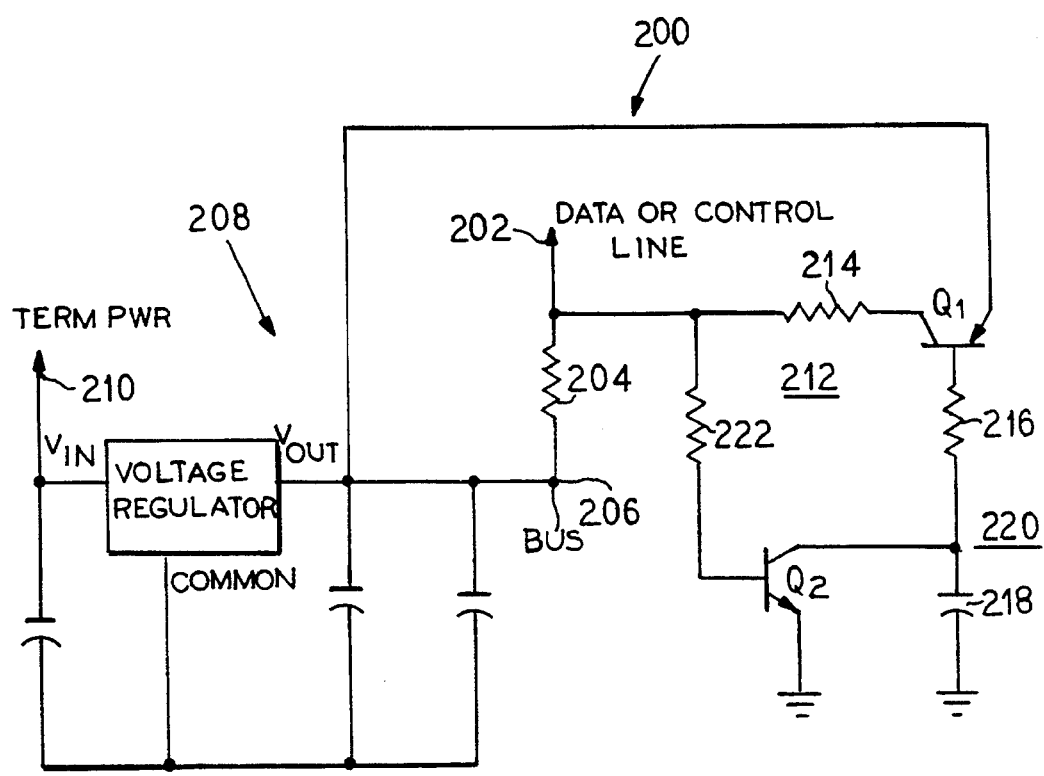
FIG. 8 illustrates a circuit diagram of another embodiment of the terminator apparatus of FIG. 3.

FIG. 8 illustrates another embodiment 200 of the terminator apparatus of FIG. 3 wherein the terminator network comprises a 110 ohm voltage regulated terminator. As illustrated, a data or control line 202, e.g. a REQ or ACK signal line, is coupled to a bus 206 via a 110 ohm resistor 204. A suitable voltage regulator arrangement 208 is coupled between terminal power (TERMPWR) 210 and the bus 206.

As also illustrated, a PNP transistor Q1 of a current switch 212 is coupled to line 202 via resistor 214. The base of the transistor Q1 is coupled to ground via serially connected resistor 216 and capacitor 218. The base of an NPN transistor Q2 is coupled to line 202 via a resistor 222 while the collector of transistor Q2 is connected between the resistor 216 and the capacitor 218.

In a manner similar to the arrangement set forth in FIG. 4, when the signal line 202 is deasserted (high logic level), the transistor Q2 of the monitoring circuit 220 will be turned on due to the base drive current via the resistor 222. Any residual voltage on the capacitor 218 will then be discharged to ground via the transistor Q2. Additionally, the base of the transistor Q1 will also be placed at the ground potential via the resistor 216. AS a result, the transistor Q1 will be rendered conductive. Consequently, the resistor 214 will then be connected to the regulated power supply out Vout via the transistor Q1. This stable condition causes the power supply voltage Vout to be connected to the signal line 202 via the resistor 214. Transistor Q1 and Q2 and the monitor circuit 220 then function as set forth above in connection with FIG. 4.

Figure 6:
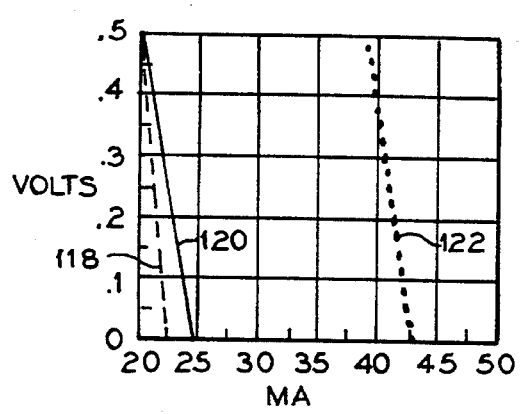
FIG. 6 illustrates curves, illustrating currents appearing in the respective signal lines.

In FIG. 6, curve 118 shows the amount of current flowing in the signal line of the prior art termination network 10 when it is pulled down below the minimum assertion level of +0.5 volts and all the way down to zero volts. Similarly, curve 120 shows the amount of current flowing in the signal line of the prior art termination network 10a when it is pulled down between +0.5 volts and zero volts. However, it will be noted that there is no appreciable amount of increased current, and thus the respective notches N1 and N2 in FIG. 5 will be created. On the other hand, curve 122 shows the amount of current flowing in the signal line of the present terminator apparatus 110 when it is pulled down between +0.5 volts and zero volts. It can be seen that the current is increased in a highly controlled manner so as to raise the notch N3 (FIG. 5) and its associated stub reflection well above the critical "double trigger" area.

Figure 7:
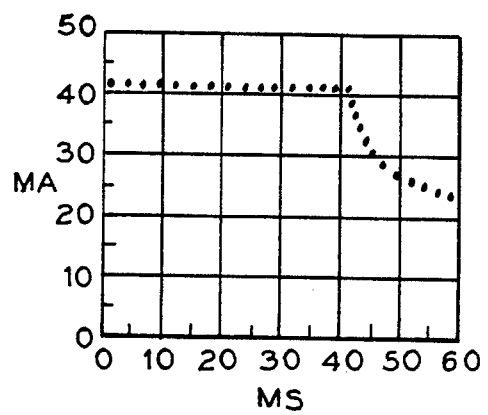
FIG. 7 illustrates a curve of the current as a function of time appearing on the signal line in the terminator apparatus of the present invention.

In FIG. 7, there is shown the amount of current flowing in the signal line of the present terminator apparatus 110 as a function of time. As noted, when the programmed length of time is exceeded (i.e., 40 ms), the current will be slowly changed from approximately 41 mA to 24 mA. This gradual change is controlled by the capacitor C1 and the transistor Q1 and thus again avoids the generation of transients.

In the typical situation, the control signal REQ will be deasserted (high logic level) before the expiration of this programmed length of time. When this deassertion occurs, the transistor Q2 will be turned on again so as to discharge the capacitor C1. As a result, the terminator apparatus 110 is reset to its original condition, and a new cycle is repeated. It should be understood that the terminator apparatus is always reset when the request signal line is deasserted. In other words, whenever the error is cleared after the system is "hung," the terminator apparatus is returned automatically to its original condition.

From the foregoing detailed description it can thus be seen that the present invention provides an improved terminator apparatus used with a SCSI bus line for controlling the voltage level of a notch occurring in data and/or control signals transferred on the bus line. The terminator apparatus is comprised of a termination network, a current switching device, and a programmed monitoring circuit. The terminator apparatus serves to prevent erroneous data from being transferred by raising the voltage level of the notch above the critical "double trigger" area.

Figure 9:
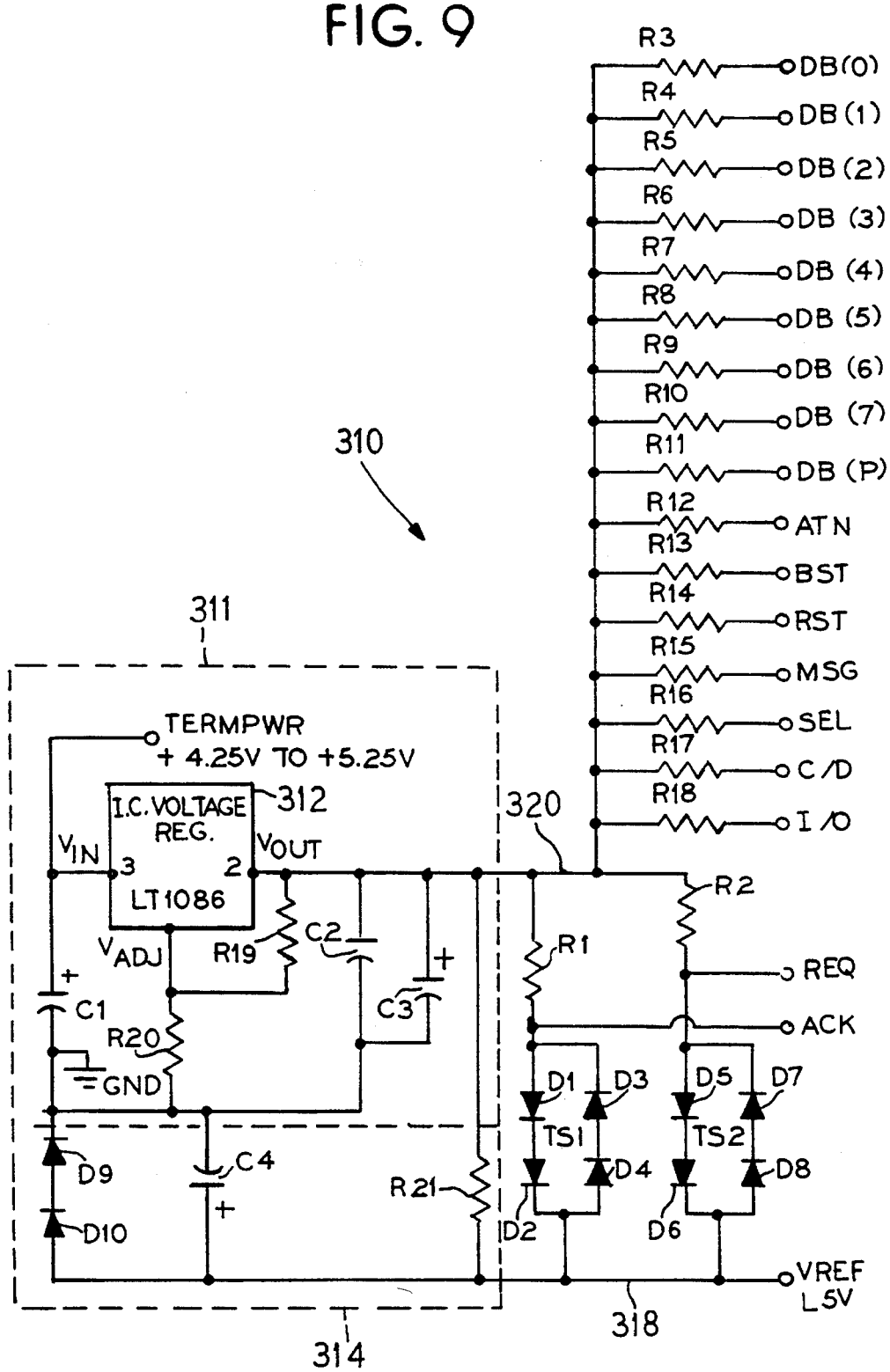
FIG. 9 illustrates a detailed schematic circuit diagram of an improved terminator apparatus, constructed in accordance with the principles of the present invention.

Referring now to FIG. 9, an improved signal line impedance matching (SLIM) terminator apparatus 310 is illustrated which is constructed in accordance with the principles of the present invention.

Reference is also made to U.S. Pat. No. 5,239,559, the disclosure of which is incorporated herein by reference, wherein such SLIM terminator apparatus also is disclosed.

The terminator apparatus 310 is adapted to be used with or is connected to ends of the SCSI bus line (such as bus line 214) for removing noise spikes or transients from data and/or control signals received on the bus line. The terminator apparatus 310 includes a voltage regulator 311 formed of an adjustable 3-terminal I.C. low voltage dropout regulator 312 such as LT1086CT, a low voltage regulating circuit 314, a plurality of pull-up termination resistors R1–R18, and transient suppression networks TS1 and TS2 for removing or attenuating transients or noise spikes.

The low voltage dropout regulator 312 has its input pin 3 connected to an input terminal 316 for receiving an input termination power supply voltage TERMPWR (Vin), which is typically at +4.75 volts but can be varied in the range of +4.25 volts to 5.25 volts in accordance with ANSI specification X3T9.2/86-109REV10c. The voltage regulator 312 has an output pin 2 for generating a regulated output voltage (Vout), which is typically at 2.85 volts. However, this output voltage can be adjusted to any value lower than +4.25 volts by selecting the values of series-connected resistors R19 and R20 which are coupled between the output pin 2 and a ground potential GND. The junction of the resistors R19 and R20 is connected to an adjustment pin 1 of the voltage regulator.

A capacitor C1 is connected between the input terminal 316 and the ground potential GND for shunting any low frequency noise appearing on the input termination power supply voltage TERMPWR to the ground potential. A capacitor C3 is connected between the output pin 2 of the voltage regulator and the ground potential GND for shunting any low frequency noise appearing on the output voltage Vout to the ground potential. A capacitor C2 is also connected between the output pin 2 and the ground potential GND for shunting any high frequency noise appearing on the output voltage Vout to the ground potential.

The low voltage regulating circuit 314 is comprised of a current-limiting resistor R21, diodes D9 and D10, and a capacitor C4. One end of the resistor R21 is connected to the regulated output voltage on the pin 2 of the voltage regulator, and the other end of the resistor R21 is connected to one end of the capacitor C4, to the anode of the diode D10, and to a reference line 318. The cathode of the diode D10 is connected to the anode of the diode D9. The cathode of the diode D9 is connected to the other end of the capacitor C4 and to the ground potential GND. The reference line 318 provides a reference voltage VREF for the suppression networks TS1 and TS2. Assuming that the forward voltage drop across the diodes D9 and D10 is each 0.75 volts, the reference voltage VREF is approximately +1.5 volts. Thus, the value of the resistor R21 is selected so that the current flowing through these diodes will produce the reference voltage of +1.5 volts at V reference.

One end of each of the plurality of pull-up termination resistors R1 through R18 is commonly connected together and to the regulated output voltage on line 320. The other ends of the resistors R1 through R18 are connected to one end of the respective data and/or control signal lines ACK, REQ, DB(0) through DB(7), DB(P), ATN, BSY, RST, MSG, SEL, C/D, and I/O. The pull-up resistors R1 through R18 function in the same manner as the resistors P1–P18 in FIG. 2 of the prior art and serve to supply the current to a respective open collector transistor device formed in a corresponding transmitting device that is coupled to the SCSI bus line. In particular, when the open collector transistor device associated with the respective data and/or control signal lines is turned off, such signal line will be at a high logic level and no current will flow through the corresponding pull-up resistor. When the open collector transistor device associated with the respective date and/or control signal lines is turned on (signal line is active), such signal line will be at a low logic level and the maximum current through the open collector transistor device is limited by the corresponding pull-up resistor.

The transient suppression network TS1 is interconnected between the control signal line (ACK) and the reference line 318. The transient suppression network TS1 is a diode array formed of diodes D1 through D4. The anode of the diode D1 is connected to the cathode of the diode D3 and to the control signal line (ACK). The cathode of the diode D1 is connected to the anode of the diode D2. The anode of the diode D3 is connected to the cathode of the diode D4. The cathode of the diode D2 is connected to the anode of the diode D4 and to the reference voltage VREF on the line 318. The transient suppression network TS1 functions as a variable resistor which dynamically changes its impedance dependent upon the amount of current flowing therethrough.

Similarly, the transient suppression network TS2 is interconnected between the control signal (REQ) and the reference line 318. The transient suppression network TS2 is a diode array formed of diodes D5 through D8. The anode of the diode D5 is connected to the cathode of the diode D7 and to the control signal line (REQ). The cathode of the diode D5 is connected to the anode of the D6. The anode of the diode D7 is connected to the cathode of the diode D8. The cathode of the diode D6 is connected to the anode of the diode D8 and to the reference voltage VREF on the line 318. The transient suppression network TS2 functions likewise as a variable resistor which dynamically changes its impedance dependent upon the amount of current flowing therethrough.

It should be clearly understood to those skilled in the art that additional transient suppression networks similar to TS1 could be connected between each of the other remaining signal lines and the reference line 318 so as to suppress transients. However, in order to reduce costs, the transient suppression networks are generally implemented only with the signal lines which are highly susceptible to transients. In other words, at least the control signal lines (ACK) and (REQ) being the most critical to reliable and accurate data transfer have been implemented with such transient suppression networks.

Figure 10A:
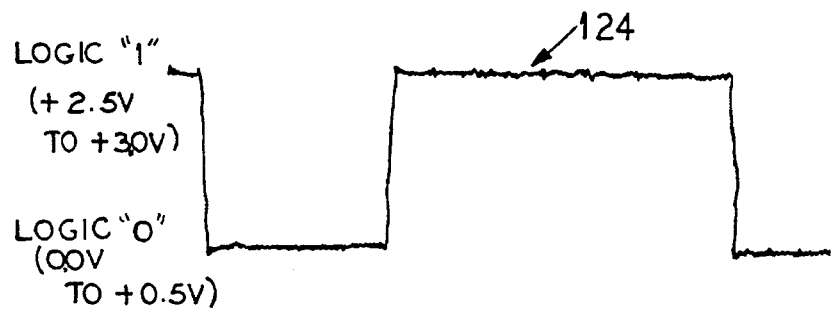
FIG. 10A and 10B illustrate a waveform, appearing on one of the signal lines in the terminator apparatus of the present invention, illustrating that the noise spikes or transients have been removed.

The operation of the present terminator apparatus 310 of FIG. 9 will now be explained with reference to FIGS. 10A and 10B. As can be seen, when the signal line is at the high logic level (i.e., between ±2.5 to ±3.0 volts), there is a positive spike at point A extending above the high logic level. Also, when the signal line is at the low logic level (i.e., between 0.0 to 0.5 volts) there is a negative spike at point B extending below the low logic level. If these transients appearing at the points A and B are sufficiently long in duration and have large enough amplitudes, these transients could be interpreted by a receiving device coupled to the SCSI bus line as a valid signal. As a result, such transients may cause incorrect data to be transferred.

Figure 10B:

The improved terminator apparatus 310 in FIG. 9 of the present invention will remove or attenuate the transients appearing on the control signal lines REQ and ACK so as to produce the waveform 122 of FIG. 10B. When the signal line (i.e. control signal line REQ) is at the high logic level and a transient appears like the one at the point A (FIG. 5) which exceeds the high logic level, the diodes D5 and D6 will be rendered conductive so as to clamp the control signal REQ to a voltage equal to two diode drops above the reference voltage VREF or approximately +3.0 volts, thereby effectively eliminating the transient. In other words, the diodes D5 and D6 limit the upper voltage level on the control signal line REQ.

When the control signal line REQ is at the low logic level and the transient appears like the one at the point B (FIG. 10A) which falls below the low logic level, diodes D7 and D8 will be rendered conductive so as to clamp the control signal REQ to the low logic level or approximately zero volts. In other words, the diodes D7 and D8 limit the lower voltage level on the control signal REQ.

For completeness in the disclosure of the above-described terminator apparatus but not for purposes of limitation, the following representative values and component identifications are submitted. These values and components were employed in a terminator apparatus that was constructed and tested and which provides a high quality performance. Those skilled in the art will recognize that many alternative elements and values may be employed in constructing the circuits in accordance with the present invention.

| PART | TYPE OR VALUE |
| --- | --- |
| C1 | 4.7 μf |
| C2 | .1 μf |
| C3 | 22 μf |
| C4 | 2.2 μf |
| R19 | 121 Ohms |
| R1–R18 | 110 Ohms |
| R20 | 154 Ohms |
| D1–D10 | BAV 99 |

Therefore, with the above values used, the terminator apparatus 310 of the present invention will generally provide a regulated output voltage of +2.85 volts with a termination impedance of 110 Ohms which meets the maximum current specification. Further, the suppression networks TS1 and TS2 will remove any transients by limiting the range of the upper voltage level and the lower voltage level of the control signals REQ and ACK.

However, since it has been encountered in the computer equipment industry that many of the SCSI cables have a lower impedance than 110 Ohms and is more on the order of 80 Ohms, it would be desirable to easily modify the terminator apparatus 110 so as to accommodate the different impedances. It is merely needed to lower the regulated output voltage Vout so that the maximum current requirement is met when the termination impedances (R1–R18) are lowered to 80 Ohms. Accordingly, it has been discovered that the output voltage should be reduced to approximately +2.15 volts when driving an 80 Ohm termination impedance. Therefore, it will be apparent to those skilled in the art that the output voltage further can simply be adjusted to a desired value so as to accommodate the variety of different impedances of the SCSI cables.

From the foregoing detailed description, it can thus be seen that the present invention provides an improved terminator apparatus used with an SCSI bus line for removing noise spikes or transients from data and/or control signals received on the bus line. The terminator apparatus is comprised of a voltage regulator, a low voltage regulating circuit, a plurality of pull-up resistors, and suppression networks. The suppression networks serve to remove transients from the signal lines by limiting the range of the upper voltage level and the lower voltage level of the control signals appearing thereon.

Figure 11:
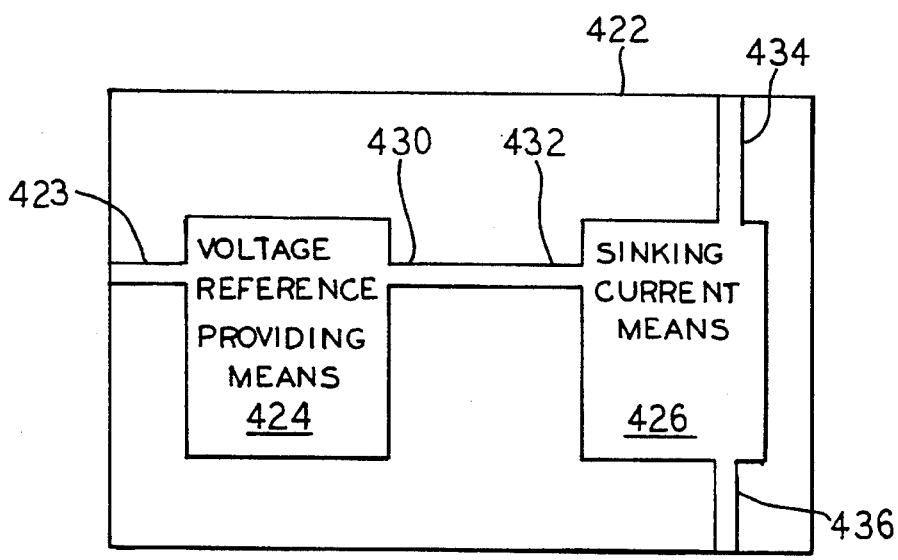
FIG. 11 illustrates a block diagram of an active deassertion circuit made in accordance with the present invention.
Figure 12:
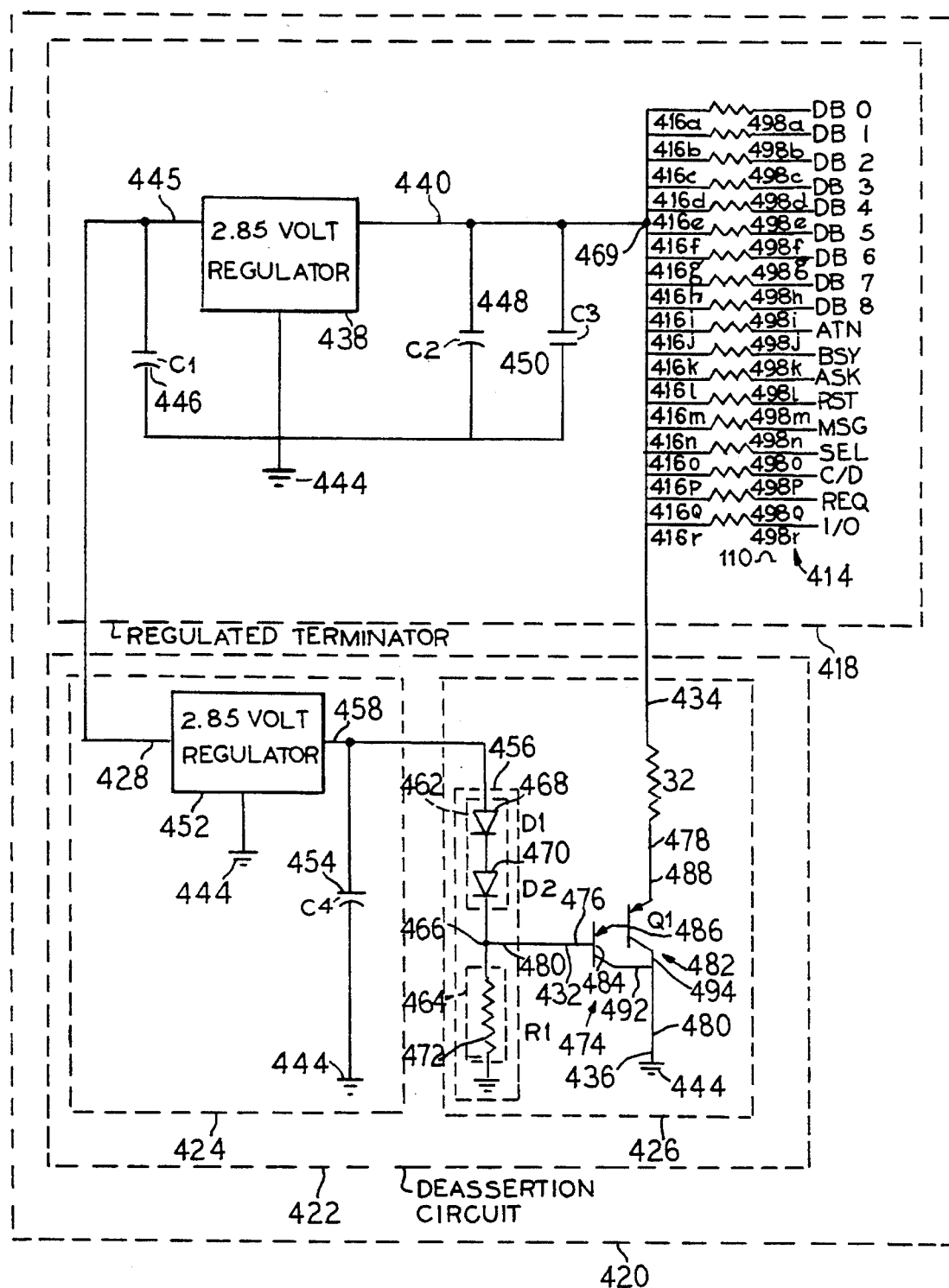
FIG. 12 illustrates a detailed schematic of the active deassertion circuit of FIG. 11 and its placement within a part of the SCSI system.

FIG. 11 shows an active deassertion circuit 422 in block diagram form. The active deassertion circuit 422 is comprised of a means for providing a voltage reference 424 and a means for sinking current 426. The means for providing a voltage reference 424 has an input 428 and an output 430. The means for sinking current 426 has a first input 432 that is coupled to the output 430 of the means for providing a voltage reference 424. The means for sinking current 426 also has a second input 434 and an output 436. FIG. 12 shows the active deassertion circuit 422 and its placement within a SCSI system denoted by reference numeral 420. The regulated terminator 418 is comprised of a 2.85 volt voltage regulator 438, the output 440 of which is coupled to each signal line 416a through 416r of the transmission line 414. The voltage regulator 438 is connected to a common voltage 444. Other features of the regulated terminator 418, such as its input 445 and its capacitors, 446, 448 and 450, are connected as shown. The means for sinking current 426 of the active deassertion circuit 422 is coupled to each signal line 416a through 416r, and the output 440 of the voltage regulator 438 via its second input 434. These are the only connections that need be made between the SCSI system 420 and the active deassertion circuit 422. However, preferably, the input 428 of the means for providing a voltage reference 424 is connected to the input 445 of the regulated terminator 418 which enables both the regulated terminator 418 and the active deassertion circuit 422 to operate off of the same power means (not shown).

Again referring to FIG. 12, the means for providing a voltage reference 424, or voltage reference circuit, is preferably comprised of a voltage regulator 452, a capacitor 454 and a voltage divider circuitry 456. The voltage regulator 452 has an input 428 that is identical to the input 428 of the means for providing a voltage reference 424. The voltage regulator has an output 458 and is connected to the common voltage 444, preferably ground. Preferably, the voltage regulator 452 is part LT11172.85 manufactured by Linear Technology Corporation. The capacitor 454 is interposed between the output 458 of the voltage regulator 452 and the common voltage 444 and is, preferably, a 22 microfarad capacitor. The voltage divider circuitry 456 is interposed between the output 458 of the voltage regulator 452 and the common voltage 444. The voltage divider circuitry 456 is comprised of diode means 462 serially connected with impedance means 464 at a junction 466 that serves as the output 430 of the means for providing a voltage reference 424. Preferably, the diode means 462 is part number BAV99, manufactured by Phillips. Thus, it is manifest that the capacitor 454 and the voltage divider circuitry 456 are in parallel with each other. Preferably, the diode means 462 is comprised of a pair of diodes 468 and 470, interposed between the output 458 of the voltage regulator 452 and the output 430 of the means for providing a voltage reference 424, or junction 466. Also, the impedance means 464 is preferably a resistor 472 that is interposed between the junction 466 and the common voltage 444 having a value of 3.3 kOhms.

Yet again referring to FIG. 12, the means for sinking current 426, or current sink, is comprised of transistor means 474 having a base 476, emitter 478, and a collector 480. The base 476 serves as a first input 432 to the means for sinking current 426 and is coupled to the junction 466. Preferably, the transistor means 474 is comprised of a Darlington transistor 482 arranged from two PNP transistors 484 and 486 as shown. Preferably, the Darlington transistor 482 is part number FTZ705, manufactured by Zetex. In this configuration, an emitter 488 of transistor 486, and thus the emitter 478 of the transistor means 474, has a resistor 490 preferably with a value of 0.22 ohms connected to it. The resistor 490 serves as the second input 434 to the means for sinking current 426. Further in this configuration, the collectors 492 and 494 of the transistors 484 and 486 respectively serve as the output 436 to the means for sinking current 426 and the collector 480 of the transistor means 474. Preferably, the output 436 is connected to the common voltage 444 as shown.

Again referring to FIG. 12, by its very nature, the quiescent operating point of the Darlington transistor 482 will not be stable over the entire environmental temperature range over which the active deassertion circuit 422 may operate. However, matching the temperature coefficient of diode means 462 with the temperature coefficient of the junction of the emitter 478 and the base 476 alleviates this problem. Thus, although, for instance, one can practice the claimed invention by using a zener diode (not shown) as the means for providing a voltage reference 424, a zener diode is not the preferable structure.

Still referring to FIG. 12, the second input 434 is coupled to both the output 440 of the voltage regulator 438 of the regulated terminator 418 and the signal lines 416a through 416r at a node 469. If there are no actively deasserted signal lines 416a through 416r, the voltage regulator 438 will provide a voltage of 2.85 volts at the second input 434. However, if a signal line 416a through 416r is actively deasserted, the node 469 will be at a voltage greater than 2.85 volts due to characteristics of its drivers (not shown). Since each of the signal lines 416a through 416r has a 110 ohm resistor, 498a through 498r, an asserted line will normally draw more than 24 mA (which is outside of the ANSI standard) if an active deassertion circuit 422 is not present. In fact, the more signal lines, 416a through 416r, that are deasserted, the farther the current through each asserted line exceeds the maximum current allowed by the ANSI standard due to the increase in the overall current through the signal lines, 416a through 416r.

Having described the structure of the active deassertion circuit 422 and its connections to SCSI system 420, the method of use of the active deassertion circuit 422 will be apparent to those of skill in the art. The method of use prevents overcurrent on signal lines, 416a through 416r, due to the active deassertion of at least one other signal line, 416a through 416r. First, one must provide a regulated terminator 418 having an output 440. Next, one must couple a plurality of signal lines 416 through 416r, to the output of the regulated terminator. Next, one must couple the second input 434 of the active deassertion circuit 422 to the output 440 of the regulated terminator 418. Next, one may assert at least one of the plurality of signal lines 416a through 416r. Next, one must actively deassert at least one of the plurality of signal lines, 416a through 416r. Next, one must compare the first input 432 of the means for sinking current 426 to the second input 434 of the means for sinking current 426. Finally, one must sink current through the means for sinking current 426 until none of the asserted plurality of signal lines 416a through 416r draws current in excess of that which is permitted by its communications protocol.

The invention has been described in detail with particular reference to an active deassertion circuit 422 comprised of a means for providing a reference voltage 424 and a means for sinking current 426. However, those skilled in the art understand that there are numerous variations and modifications of the present invention. For instance, as explained above, the present invention could use a zener diode as the means for providing a voltage reference 424 and still fall within the ambit of the claims. Also any temperature compensating voltage reference can be used in place of the voltage reference.

Figure 13:
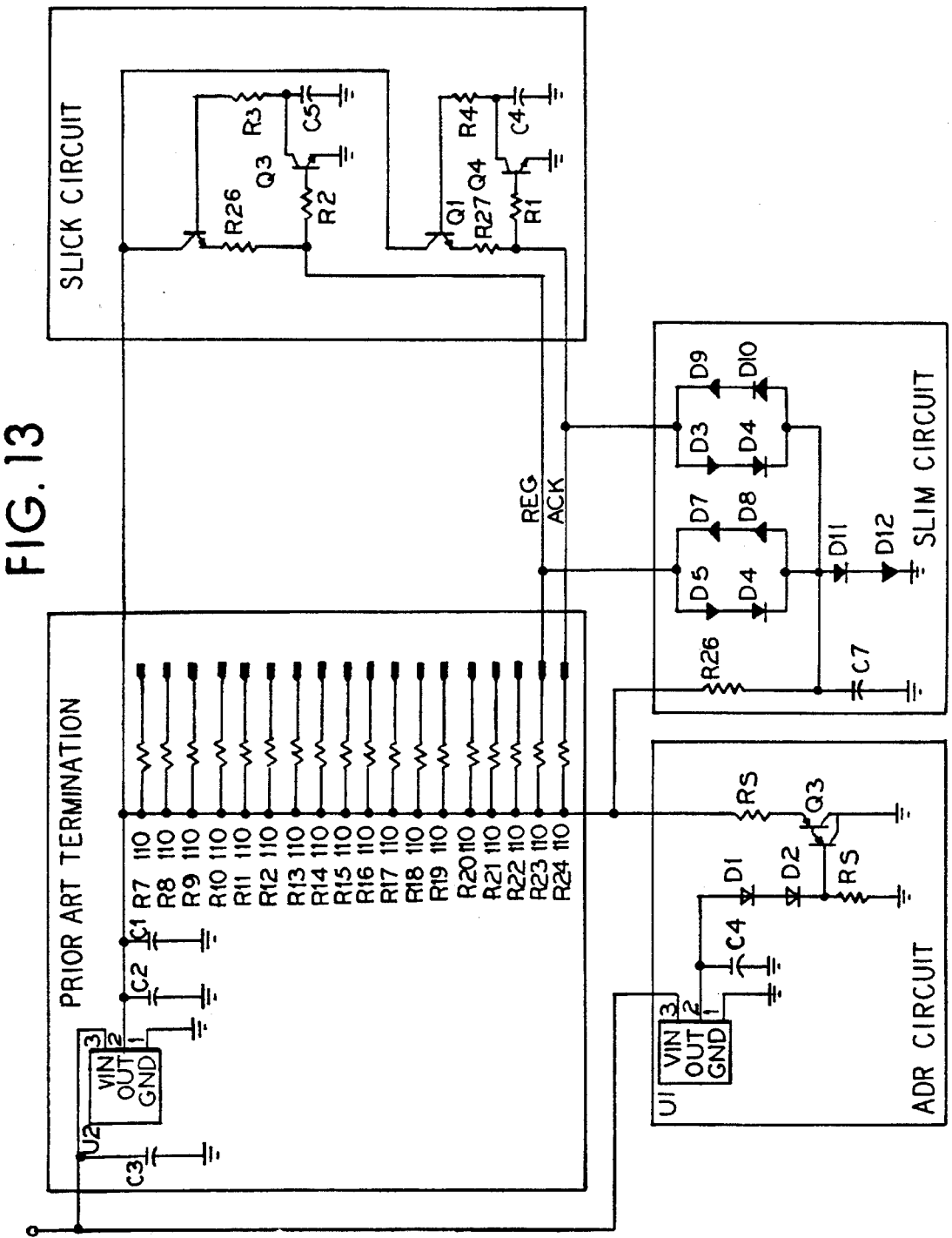
FIG. 13 illustrates a detailed schematic diagram of a terminator network interconnected with a first terminator apparatus, a second terminator apparatus and an active deassertion circuit in accordance with the present invention.

In FIG. 13 there is illustrated a particular embodiment of the invention wherein a terminator apparatus is provided with a SLICK circuit, an ADR circuit and a SLIM circuit in addition to a typical termination network. As can be appreciated, the SLICK circuit actually consists of two SLICK circuits, one each for the REQ and ACK signal lines of the SCSI bus. Similarly, the SLIM circuit includes two suppression networks, one each for the REQ and ACK signal lines. Only one current sink is required in the ADR circuit because it is connected to the output node of the regulated power supply voltage rather than individual signal lines.

It should be understood that various changes and modifications to the presently preferred embodiments described herein will be apparent to those skilled in the art. Such changes and modifications may be made without departing from the spirit and scope of the present invention and without diminishing its attendant advantages. It is, therefore, intended that such changes and modifications be covered by the appended claims.

We claim:

1. A line terminator comprising:

a supply voltage;

a plurality of resistors each having a first end and a second end, said first end of said plurality of resistors connected to the supply voltage, said second end of said plurality of resistors connected to a corresponding one of a plurality of signal lines;

a signal line increased current kicker circuit, including:

a current switching device interconnected between the supply voltage and at least one of the plurality, of signal lines for generating a current for the signal line, the current switching device having a control input; and a programmed monitoring circuit interconnected between the current switching device control input and the signal line for controlling a programmed length of time that the current is generated, the current switching device being responsive to the monitoring circuit for disconnecting the current when the programmed length of time has been exceeded, the current serving to raise the voltage level of a notch occurring in a signal transferred via the signal line when the signal line is deasserted so as to prevent erroneous data from being transferred; and an active deassertion circuit for a regulated terminator providing a constant voltage output to a plurality of signal lines comprising:

(a) means for providing a voltage reference having an input and an output; and (b) means for sinking current having a first input, a second input, and an output, the first input being coupled to the output of the means for providing a voltage reference and the second input being coupled to said constant voltage output of the regulated terminator;

whereby the means for sinking current is capable of comparing its first input to its second input and, when voltage at the second input momentarily exceeds the first input due to active deassertion of at least one signal of said plurality of signal lines, sinking current to prevent overcurrent on other signal lines that are asserted or are going to be asserted to maintain said constant voltage.

2. A line terminator comprising:

a supply voltage;

a plurality of resistors each having a first and a second end, said first end of said plurality of resistors connected to the supply voltage, said second end of said plurality of resistors connected to a corresponding one of a plurality of signal lines;

a signal line increased current kicker including:

a current switching device interconnected between the supply voltage and at least one of the signal lines for generating a current for the signal line, the current switching device having a control input; and a programmed monitoring circuit interconnected between the current switching device control input and the signal line for controlling a programmed length of time that the current is generated, whereby the current switching device being responsive to the monitoring circuit for disconnecting the current when the programmed length of time has been exceeded, the current serving to raise the voltage level of the notch occurring in the signal line when the signal line is deasserted so as to prevent erroneous data from being transferred; and a signal line impedance matching terminator apparatus connected to each of a SCSI bus line for removing noise spikes or transients from data and/or control signals received on the bus line, each of the terminator apparatus comprising:

voltage regulator means responsive to an input termination power supply voltage for generating a regulated output voltage of a predetermined value;

low voltage regulating circuit means responsive to the regulated output voltage for generating a reference voltage; and suppression network means interconnected between at least one of said plurality of data and/or signal lines and the reference voltage for removing transients from the data and/or control signal by limiting the range of the upper voltage and the lower voltage level appearing thereon.

3. A line terminator comprising:

a supply voltage;

a plurality of resistors each having a first end and a second end, said first end of said plurality of resistors connected to the supply voltage, said second end of said plurality of resistors connected to a corresponding one of a plurality of signal lines;

an active deassertion circuit for a regulated terminator providing a constant voltage output to a plurality of signal lines comprising:

(a) means for providing a voltage reference having an input and an output; and (b) means for sinking current having a first input, a second input, and an output, the first input being coupled to the output of the means for providing a voltage reference and the second input being coupled to said constant voltage output of the regulated terminator;

whereby the means for sinking current is capable of comparing its first input to its second input and, when voltage at the second input momentarily exceeds the first input due to active deassertion of at least one signal of said plurality of signal lines, sinking current to prevent overcurrent on other signal lines that are asserted or are going to be asserted to maintain said constant voltage; and a signal line impedance matching terminator apparatus connected to each of a SCSI bus line for removing noise spikes or transients from data and/or control signals received on the bus line, each of the terminator apparatus comprising:

voltage regulator means responsive to an input termination power supply voltage for generating a regulated output voltage of a predetermined value;

low voltage regulating circuit means responsive to the regulated output voltage for generating a reference voltage; and suppression network means interconnected between at least one of said plurality of data and/or signal lines and the reference voltage for removing transients from the data and/or control signal by limiting the range of the upper voltage and the lower voltage level appearing thereon.

4. A line terminator comprising:

a supply voltage;

a plurality of resistors each having a first end and a second end, said first end of said plurality of resistors connected to the supply voltage, said second end of said plurality of resistors connected to a corresponding one of a plurality of signal lines;

a signal line increased current kicker circuit including:

a current switching device interconnected between the power supply voltage and at least one of the signal lines for generating a current for the signal line, the current switching device having a control input; and a programmed monitoring circuit interconnected between the current switching device control input and the signal line for controlling a programmed length of time that the current is generated, whereby the current switching device being responsive to the monitoring circuit for disconnecting the current when the programmed length of time has been exceeded, the current serving to raise the voltage level of a notch occurring in a signal transferred via the signal line when the signal line is deasserted so as to prevent erroneous data from being transferred;

an active deassertion circuit for a regulated terminator providing a constant voltage output to a plurality of signal lines comprising:

(a) means for providing a voltage reference having an input and an output; and (b) means for sinking current having a first input, a second input, and an output, the first input being coupled to the output of the means for providing a voltage reference and the second input being coupled to said constant voltage output of the regulated terminator;

whereby the means for sinking current is capable of comparing its first input to its second input and, when voltage at the second input momentarily exceeds the first input due to active deassertion of at least one signal line of said plurality of signal lines, sinking current to prevent overcurrent on other signal lines that are asserted or are going to be asserted to maintain said constant voltage; and a signal line impedance matching terminator apparatus connected to each of a SCSI bus line for removing noise spikes or transients from data and/or control signals received on the bus line, each o the terminator apparatus comprising:

voltage regulator means responsive to an input termination power supply voltage for generating a regulated output voltage of a predetermined value;

low voltage regulating circuit means responsive to the regulated output voltage for generating a reference voltage; and suppression network means interconnected between at least one of said plurality of data and/or signal lines and the reference voltage for removing transients from the data and/or control signal by limiting the range of the upper voltage and the lower voltage level appearing thereon.

5. A line terminator comprising:

a voltage supply;

a resistor, having a first end and a second end, the first end of the resistor connected to the voltage supply, the second end of the resistor connected to a signal line;

a signal line increased current kicker switching device interconnected between the voltage supply and the signal line, the switching device having a control input; and a timer connected to the control input of the switching device, the timer responsive to an asserted condition of the signal line to limit a period of time that the switching device is closed.

6. The line terminator of claim 5, further comprising:

a means for sinking current having a first input and a second input, the first input connected to a voltage reference and the second input connected to the voltage supply; and wherein when a voltage level of the second input exceeds a voltage level of the first input, the means for sinking current sinks current from the second input.

7. A line terminator comprising:

a voltage supply;

a resistor having a first end and a second end, the first end of the resistor connected to the voltage supply, the second end of the resistor connected to a signal line;

a means for sinking current having a first input and a second input, the first input connected to a voltage reference level and the second input connected to the voltage supply;

and wherein when a voltage level of the second input exceeds a voltage level of the first input, the means for sinking current sinks current from the second input.

8. The line terminator of claim 7, further comprising:

a signal line increased current kicker switching device interconnected between the voltage supply and the signal line, the switching device having a control input; and a timer connected to the control input of the switching device, the timer responsive to an asserted condition of the signal line to limit a period of time that the switching device is closed.

9. A method of preventing errors on a signal line having a line terminator, the terminator comprised of a voltage source connected to a first end of a resistor, a second end of the resistor connected to the signal line, a signal line increased current kicker switching device interconnected between the voltage source and the signal line, said method comprising the steps of:

a) closing the switching device;

b) sensing an asserted condition of the signal line; and c) opening the switching device after the asserted condition is sensed for a predetermined period of time.

10. A method of maintaining a supply voltage applied to a terminating resistor of a signal line, a voltage source connected to a first end of the terminating resistor, a second end of the terminating resistor connected to the signal line and a current sink connected to the first end of the terminating resistor and the voltage source; said method comprising the steps of:

comparing a voltage level of the voltage source with a reference voltage;

sinking current with the current sink when the voltage level of the voltage source exceeds the reference voltage.

11. A method of preventing errors on a signal line and maintaining a supply voltage applied to a terminating resistor of the signal line, the signal line having a line terminator, the terminator comprised of a voltage source connected to a first end of a resistor, a second end of the resistor connected to the signal line, a signal line increased current kicker switching device interconnected between the voltage source and the signal line, and a current sink connected to the second end of the terminating resistor and the voltage source; said method comprising the steps of:

a) closing the switching device;

b) sensing an asserted condition of the signal line;
c) opening the switching device after the asserted condition is sensed for a predetermined period of time;
d) comparing a voltage level of the voltage source with a reference voltage; and
e) sinking current with the current sink when the voltage level of the voltage source exceeds the reference voltage.

* * * * *